United States Patent
Tappan et al.

(10) Patent No.: US 11,340,141 B2
(45) Date of Patent: May 24, 2022

(54) EXCEPTION-BASED ROUTE PLAN GENERATION

(71) Applicant: Bently Nevada, LLC, Minden, NV (US)

(72) Inventors: Jacqueline Marie Tappan, Minden, NV (US); Ryan Gregory Roaldson, Glenbrook, NV (US)

(73) Assignee: BENTLY NEVADA, LLC, Minden, NV (US)

( * ) Notice: Subject to any disclaimer, the term of this patent is extended or adjusted under 35 U.S.C. 154(b) by 720 days.

(21) Appl. No.: 16/201,805

(22) Filed: Nov. 27, 2018

(65) Prior Publication Data

US 2020/0166433 A1 May 28, 2020

(51) Int. Cl.
| | | |
|---|---|---|
| *G06F 3/0482* | (2013.01) |
| *G01M 99/00* | (2011.01) |
| *G08B 21/18* | (2006.01) |
| *G06F 3/04847* | (2022.01) |

(52) U.S. Cl.
CPC ......... *G01M 99/005* (2013.01); *G08B 21/187* (2013.01); *G06F 3/0482* (2013.01); *G06F 3/04847* (2013.01)

(58) Field of Classification Search
CPC .. G01M 99/005; G08B 21/187; G06F 3/0482; G05B 23/0272; G06Q 10/0639; G06Q 10/20; G01D 21/02
See application file for complete search history.

(56) References Cited

U.S. PATENT DOCUMENTS

2009/0077055 A1 3/2009 Dillon et al.

OTHER PUBLICATIONS

Sijm et al., The Road to a Fully Integrated Asset Management Strategy Applied to Rotating Equipment, 2011 Turbomachinery Laboratory, Texas A&M University, 21 pp. (Year: 2011).*
Google Search Results, Jul. 6, 2021, 1 pp. (Year: 2021).*
European Search Report and the Written Opinion corresponding to Patent Application No. 19211363.7 dated Apr. 14, 2020.

* cited by examiner

*Primary Examiner* — Toan M Le
(74) *Attorney, Agent, or Firm* — Mintz Levin Cohn Ferris Glovsky and Popeo, PC; Lisa Adams

(57) ABSTRACT

Systems and methods are provided for determining a route plan identifying a list of assets for which additional sensor data is to be acquired. A condition monitoring system can be communicatively coupled to sensors which are interfaced to assets in a collection of assets. Accordingly, the assets can be monitored for fault conditions associated with operating parameters of the assets. Based on a fault condition alarm generated for an asset, route plan input can be received by the condition monitoring system. The route plan input can be processed to determine a route plan based on matching condition monitoring attributes in the route plan input with condition monitoring attributes associated with the assets in the collection of assets. The route plan can identify a list of assets for which additional sensor data can be collected.

18 Claims, 6 Drawing Sheets

Figure 5

Collection 1 Route Plan 160

| Assets 115 | Fault Conditions |
|---|---|
| 115B | Alarm Level: 3<br>Criticality: Critical<br>Priority: Satisfactory |
| 115D | Alarm Level: 4<br>Criticality: Critical<br>Priority: Unacceptable |
| 115E | Alarm Level: 3<br>Criticality: Highly Critical<br>Priority: Unacceptable |
| 115H | Alarm Level: 4<br>Criticality: Critical<br>Priority: Unacceptable |

EXCEPTION-BASED ROUTE PLAN GENERATION

BACKGROUND

Many industries, such as oil and gas exploration, hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more machine components by manually collecting sensor data from each and every machine in a collection of machines using a route plan identifying all machines for which data is to be collected. Measurements of the operating parameters which are manually collected in this manner can provide an indication of the operating condition of a machine component and can indicate when additional measurements are required to diagnose fault conditions exhibited by a machine prior to failure. This form of monitoring can provide one or more long term benefits, such as lower production costs, reduced equipment down time, improved reliability, and enhanced safety.

SUMMARY

As energy production demands increase and workforce sizes decrease, monitoring the condition of each and every asset can be increasingly difficult to perform safely. Reduced workforce sizes can make it difficult to comprehensively monitor large numbers of assets by manually collecting data on regular, pre-defined schedules from each and every machine, especially when the machines are deployed in hazardous operating environments. Condition monitoring systems can be configured to collect and process monitoring data associated with the operating conditions of the deployed machines or assets using sensors and thereby reduce the burden on smaller workforces to collect monitoring data from each and every asset in a large distributed collection of assets, such as those used in energy production operations which can be separated by long distances or situated in occupationally hazardous settings.

Sensors can be interfaced with the assets to collect continuous data indicative of the asset's operating parameters. The sensor data can be transmitted to a condition monitoring system to provide condition monitoring engineers with a view of the operational state of the assets. However, managing large volumes of sensor data can be difficult to process and require large amounts of computing power that can further increase the costs associated with energy production operations. As a result, condition monitoring systems can collect smaller quantities of lower-resolution data in order to determine the operational state of assets. Often this lower-resolution data is not of high enough fidelity or quality to provide sufficient insight as to the precise nature of a fault condition being exhibited by the asset being monitored. In such circumstances, additional higher-resolution data can be required to assess or diagnose the fault condition. However, collecting high-resolution sensor data from each and every asset in a collection of assets can also increase the complexity and costs associated with storing and processing large volumes of high-resolution sensor data. In addition, exposure to hazardous operating environments can pose safety risks for workforce resources collecting the higher-resolution sensor data from each and every deployed asset.

In general, systems and methods are provided herein for determining a route plan identifying assets from which additional condition monitoring data is to be collected. The route plan can be determined based on fault conditions associated with sensor data collected from large numbers of assets whose operational parameters are being monitored. A configuration monitoring system can process the sensor data and generate alarms when one or more asset operating parameters are determined to be in a fault condition. Condition monitoring engineers can determine a route plan to identify assets for which additional sensor data is required in order to diagnose the asset's operational state or the particular fault condition the asset is experiencing. Based on a fault condition alarm generated for one asset, the condition monitoring system can prompt condition monitoring engineers to execute a route plan to collect higher resolution data and confirm the fault conditions. In this way, condition monitoring a collection of assets can be performed dynamically and not based solely on scheduled visits to each and every asset in a collection of assets. The condition monitoring system can thus reduce the size of the workforce required to collect additional monitoring data and can also reduce the amount of computing resources required to store and process the high-resolution monitoring data. In this way, the condition monitory system can determine route plans dynamically based on operating condition exceptions, such as fault conditions that can be common among assets in a collection of assets, rather than route plans which are statically determined based on scheduled visits to each and every asset in a collection of assets.

In one embodiment, a system is provided. The system can include one or more sensors configured to interface with at least one asset in a collection of assets. The one or more sensors can be configured to generate sensor data corresponding to at least one operating parameter of the at least one asset. The at least one asset can be associated with one or more condition monitoring attributes. The system can also include a condition monitoring system communicatively coupled to the one or more sensors via a network. The condition monitoring system can include a memory, a display including a graphical user interface, and a processor configured with executable instructions. The instructions, which when executed can cause the processor to receive, via the graphical user interface, route plan input identifying one or more condition monitoring attributes. The route plan input can be received in response to a fault condition alarm generated for the at least one asset based on sensor data received from a sensor interfaced with the at least one asset indicating a fault condition associated with at the least one operating parameter. The instructions, which when executed can further cause the processor to determine, based on the route plan input, a route plan. The route plan can identify a list of assets from which additional sensor data is to be collected. The route plan can be determined based on matching the one or more condition monitoring attributes identified in the route plan input with one or more condition monitoring attributes associated with the collection of assets. The assets identified in the route plan can include assets in the same collection as the at least one asset for which the fault condition alarm was generated. The instructions, which when executed can further cause the processor to output the determined route plan.

Methods for determining a route plan identifying assets from which additional condition monitoring data is to be collected are also provided. In one embodiment, the method can include receiving, via a graphical user interface configured within a display of a condition monitoring system, route plan input identifying one or more condition monitoring attributes. The route plan input can be received in response to a fault condition alarm generated for at least one asset, in a collection of assets. The route plan input can be received based on sensor data received from a sensor interfaced with the at least one asset indicating a fault condition associated with at least one operating parameter corresponding to the received sensor data. The condition monitoring system can be communicatively coupled to one or more sensors via a network and can include a memory, the display including the graphical user interface, and a processor. The method can further include determining, by the processor and based on the received route plan input, a route plan identifying a list of assets from which additional sensor data is to be collected. The route plan can be determined based on matching the one or more condition monitoring attributes identified in the route plan input with one or more condition monitoring attributes associated with the collection of assets stored in the memory of the condition monitoring system. The assets identified in the route plan can include assets in a same collection of assets as the at least one asset for which the fault condition alarm was generated. The method can also include outputting, by the processor, the determined route plan.

In another embodiment, the collection of assets can include at least one of a motor, a gas turbine, a heat exchanger, a centrifugal pump, a centrifugal compressor, a fan, a reciprocating compressor, a generator, a steam turbine, a wind turbine, a portion of pipe, an axial compressor, a screw compressor, a gear, a turbo expander, a blower, an agitator, a mixer, a pulp refiner, a ball mill, a crusher, a pulverizer, an extruder, a pelletizer, and a cooling tower.

In another embodiment, the one or more sensors can include a proximity sensor, a velocity sensor, an accelerometer, a position sensor, a temperature sensor, a pressure sensor, a current sensor and a voltage sensor and any combination thereof.

In another embodiment, the network can include a wireless communication network, a wired communication network, or a combination of a wireless and wired communication network.

In another embodiment, the one or more condition monitoring attributes can include an alarm level attribute, a criticality attribute, and a priority attribute.

In another embodiment, the sensor data can include time-series data identifying an operating parameter value of the at least one asset measured per second, per day, and/or per month.

In another embodiment, the processor can be further configured to output the generated fault condition alarm and associated sensor data as an input to an asset fault prediction model associated with the at least one asset for which the fault condition alarm was generated or as an input to a fault prediction model associated with the collection of one or more assets including the at least one asset for which the fault condition alarm was generated.

In another embodiment, the received route plan input can identify one or more selections corresponding to an alarm level attribute, a criticality attribute, a priority attribute, and/or a selection of scheduling attributes corresponding to a frequency in which the determined route plan is to be output.

In another embodiment, the generated fault condition alarm can be provided to a user as an email, a text message, a SMS message, a phone call, an audio alert, a visual indicator on the display, and/or a visual indicator on the graphical user interface.

In another embodiment, the fault condition can be indicated based on the received sensor data exceeding a threshold value associated with the operating parameter of the at least one asset for which the sensor data was received.

DESCRIPTION OF DRAWINGS

These and other features will be more readily understood from the following detailed description taken in conjunction with the accompanying drawings, in which:

FIG. 5 is a diagram illustrating one exemplary embodiment of a graphical user interface to receive route plan input;

FIG. 6 is a diagram illustrating one exemplary embodiment of a route plan determined and output by the condition monitoring system of FIG. 1;

Figure 1:
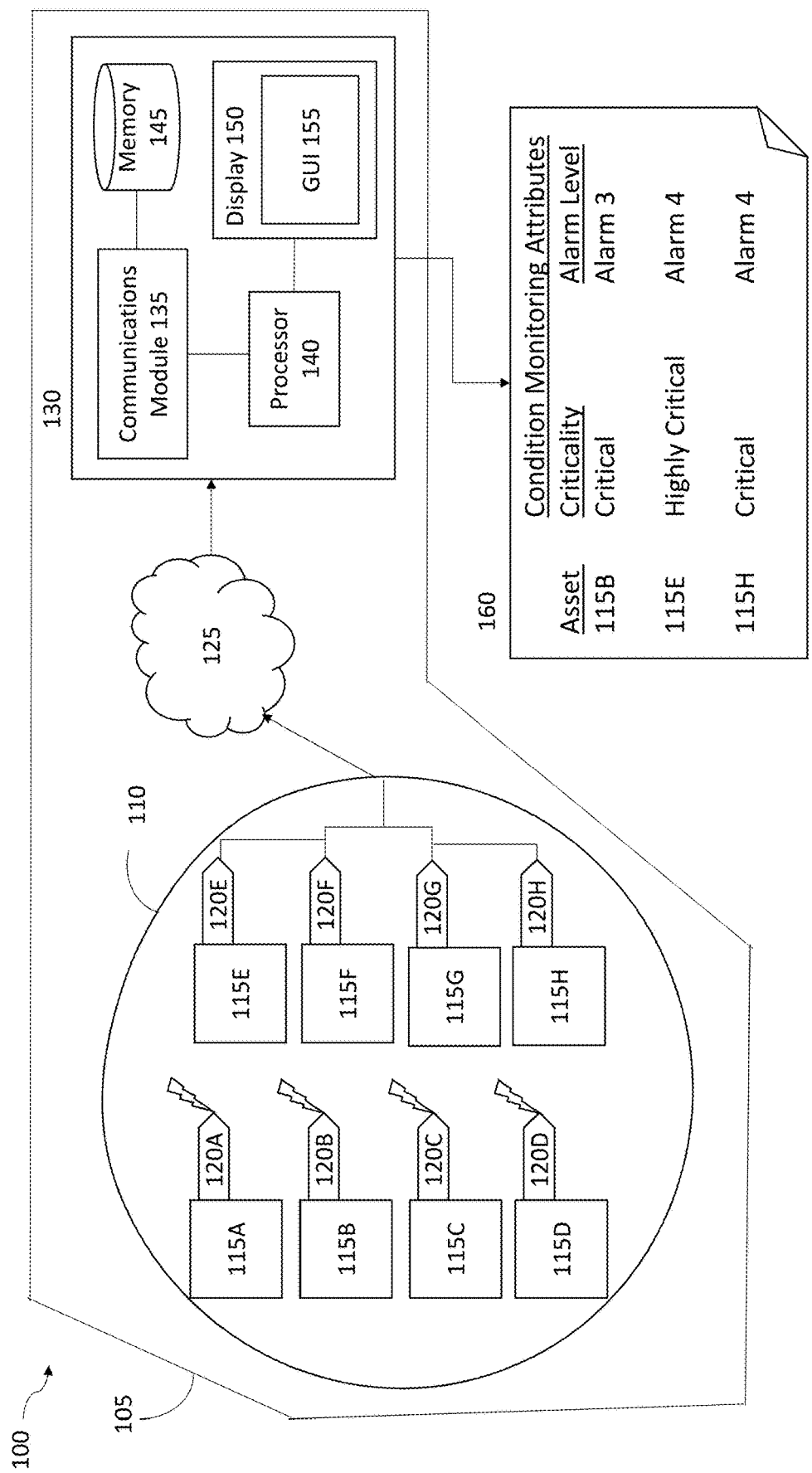
FIG. 1 is a diagram illustrating one exemplary embodiment of a condition monitoring system.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial assets, including machinery such as rotating or reciprocating equipment used in oil and gas manufacturing or power generation, can be monitored by condition monitoring systems to ensure that the operating parameters of the assets are within acceptable or specified tolerances. When the operating parameter measurements indicate an asset is not within an acceptable or specified tolerance, alarms can be generated so that corrective action can be taken on the asset in advance of machine/component failure. Typically, a corrective action response to observed alarm conditions involves determining a route plan identifying a list of all assets in a collection to visit for further evaluation and diagnosis. A route plan including each and every asset in a collection can expose workforce resources to hazardous operating environments for prolonged periods and unnecessarily compromise the safety of the workforce resources. Collecting, storing, and processing operating parameter measurements from each and every asset in a collection of assets being monitored can require significant computing power and resources. In addition, collecting data for each and every asset in this manner can increase the costs associated with portable measurement devices as well as the computing resources configured to receive, process, display, and output the condition monitoring data that was collected.

An improved condition monitoring system is provided herein including a system and methods for determining a route plan identifying only those assets in a collection from which additional condition monitoring data is to be collected. The assets identified in the route plan can include only those assets determined to be in a fault condition and/or possessing a particular condition monitoring attribute, such as the assets' criticality in a workflow or the assets priority as an asset within a collection of assets. Based on determining one or more assets in a collection are exhibiting a fault condition, the condition monitoring system can provide an interface to receive input and determine a route plan identifying only specific assets which are exhibiting a particular fault condition or possess a particular condition monitoring attribute. Condition monitoring engineers can use the determined route plan to collect additional operating measurements from the assets identified in the route plan. In this way, workforce resources may only be exposed to hazardous operating environments to collect additional measurements from specific machines and not from each and every machine or asset in a collection. The condition monitoring system can require less computing resources for data collection and processing as a result of using low power sensors to collect lower resolution measurement data from each machine and only triggering fault conditions for specific machines that require additional higher resolution data to be collected.

Embodiments of systems and corresponding methods for determining a route plan identifying assets from which additional condition monitoring data is to be collected are discussed herein. However, embodiments of the disclosure can be employed for determining a route plan identifying assets based on a variety of asset attributes without limit.

FIG. 1 is a diagram of an exemplary embodiment 100 of a condition monitoring system 105 configured to determine a route plan identifying assets from which additional condition monitoring data is to be collected. As shown in FIG. 1, the condition monitoring system 105 includes a collection of assets 110. The collection of assets 110 includes a plurality of individual assets 115, such as assets 115A-115H. Each asset 115 is interfaced with a sensor 120, such as sensors 120A-120H. The condition monitoring system 100 also includes a network 125 and an asset monitoring system 130. The asset monitoring system 130 includes a communications module 135, a processor 140, a memory 145, and a display 150 including a graphical user interface (GUI) 155. The asset monitoring system 130 can output a route plan 160 identifying assets from which additional condition monitoring data is to be collected.

As shown in FIG. 1, the condition monitoring system 105 includes a collection 110 of individual assets 115. Each asset 115 in the collection 115 is communicatively coupled to a sensor 120. The collection 110 can include assets organized in groups or sub-collections. Each collection and sub-collection of assets can be comprised of similar or dissimilar assets 115. In some embodiments, the collection 110 of assets can be associated with a particular function or a particular workflow. For example, the collection 110 can include only assets 115 that are associated with a compressor used in a gas refining operation. In other embodiments, the collection 110 of assets can be associated with multiple, disparate functions or workflows. The collection 110 can be a physical collection of assets 115 that are distributed in physical proximity to each other. The collection 110 can also be a virtual collection of assets 115 that are not located in any physical relation to one another but instead are organized based on one or more common asset attributes or functions, for example a collection 110 comprising compressor fan motors. The condition monitoring system 105 can be configured to collect and monitor operating parameter measurements and data corresponding to multiple collections 110.

As further shown in FIG. 1, the collection 110 includes a plurality of assets 115 for which the asset operating parameters are to be monitored in the condition monitoring system 105. For example, as shown in FIG. 1, the collection 110 includes eight assets 115 (e.g., asset 115A-115H). The assets 115 can include individual machines, for example compressors or motors, as well as components of individual machines, such as a compressor shaft or a motor power supply. Typically, in oil and gas energy production environments, the assets 115 can include a large variety of rotating or reciprocating equipment such as a motor, a gas turbine, a heat exchanger, a centrifugal pump, a centrifugal compressor, a fan, a reciprocating compressor, a generator, a steam turbine, a wind turbine, a portion of pipe, an axial compressor, a screw compressor, a gear, a turbo expander, a blower, an agitator, a mixer, a pulp refiner, a ball mill, a crusher, a pulverizer, an extruder, a pelletizer, and a cooling tower. The assets 115 can be deployed in industrially hazardous environments making it difficult to safely assess the condition or state of the asset by collecting condition monitoring data from the asset in a direct, hands-on manner. To reduce the risks associated with exposing workforces to these hazardous environments, sensors can be installed and configured to interface with the asset and provide sensor data identifying measurements of the operational parameters of the assets 115.

Each of the assets 115 can be characterized by one or more condition monitoring attributes within the condition monitoring system 105. A condition monitoring attribute can include an alarm level determined based on sensor data received from a sensor interfaced with the asset 115. A condition monitoring attribute can also include a criticality attribute associated with the importance of the function or role of the asset in a workflow or in a collection 110 of assets. A condition monitoring attribute can also include a priority attribute that is manually assigned to the asset 115 and indicative of the assets 115 overall operating condition.

As shown in FIG. 1, the condition monitoring system 105 includes a plurality of sensors 120. For example, sensors 120A-120H are configured to respectively interface with assets 115A-115H. The sensors 120 can include sensors configured for wireless communication, such as sensors 120A-120D configured to interface with assets 115A-115D respectively. In some embodiments the sensors 120 can include sensors configured for wired communication, such as sensors 120E-120H which as configured to interface with assets 115E-115H respectively. The collection 110 can include only wireless sensors, only wired sensors, and/or a combination of wireless and wired sensors. The sensors 120 can include a wide variety of sensors suitable for determining operating parameter measurements of assets 115. For example, the sensors 120 can include a proximity sensor, a velocity sensor, an accelerometer, a position sensor, a temperature sensor, a pressure sensor, a current sensor and a voltage sensor and any combination thereof.

The sensors 120 can be configured to sense and output measurements of one or more operating parameters of the asset 115. The number and type of sensors 120 can be dictated by the operating parameter(s) that are intended to be measured. In one aspect, the sensor 120 can take the form of one or more proximity probes for measurement of vibration, position, speed, direction of motion, and eccentricity. In another aspect, the sensor 120 can take the form of one or more accelerometers for measurement of seismic vibration and acceleration. In a further aspect, the sensor 120 can take the form of one or more temperature probes or pressure probes for measurement of temperature and pressure, respectively. It can be understood that the sensor types and corresponding operating parameters listed above are not exhaustive and embodiments of the sensor 120 can include any sensor or combination of sensors suitable for measurement of operating parameters of interest. For example, a sensor 120 can be configured to determine the vibration associated with a rotating shaft in a compressor. The sensor 120 can be interfaced to the shaft in such a way as to detect or otherwise receive vibrations associated with the rotating shaft as the compressor operates to cool a gas. The vibrations are converted to digital signals by the sensor and can be transmitted for further processing within the condition monitoring system 105.

The sensors 120 can generate sensor data as time-series data wherein any particular operating parameter measurement is recorded at a distinct point in time and a collection of sensor recorded values can be output as time-series data for a duration of time. In some embodiments, the sensors 120 can be configured to continuously collect low-resolution sensor data for example, sensor data that includes operating parameter measurements which are recorded once a day, once a week, and/or once a month. In other embodiments, the sensors 120 can be configure to continuously collect high-resolution sensor data, for example sensor data for which includes operating parameter measurements which are recorded once a microsecond, once a millisecond, once a second, once a minute, and/or once an hour.

As further shown in FIG. 1, the condition monitoring system 105 includes a network 125. The network 125 can be a wireless network, a wired network, and/or a combination of wireless and wired networks. The network 125 conveys the sensor data from the sensors 120 to the asset monitoring system 130 for further processing. The network 125 can include any combination of public and private networks configured to convey data between two or more processing entities.

As shown in FIG. 1, the condition monitoring system 105 includes an asset monitoring system 130. The asset monitoring system 130 includes a communications module 135, a processor 140, a memory 145, and a display 150 including a graphical user interface (GUI) 155. The asset monitoring system 130 is configured to receive sensor data from sensors 120 and process the received sensor data to determine fault conditions associated with any of the assets 115 in the collection 110. For example, the asset monitoring system 130 can receive sensor data from sensor 120A monitoring the temperature of oil in a motor (e.g., asset 115A). The sensor 120A can wirelessly transmit the sensor data over the network 125 to the asset monitoring system 130. Upon receipt, the asset monitoring system 130 can determine that the motor oil temperature is not within the operating parameter values associated with the asset 115A and identify the asset 115A as experiencing a fault condition (e.g., high motor oil temperature). The asset monitoring system 130 can generate a fault condition alarm to notify condition monitoring engineers of the elevated motor oil temperature of asset 115A and that additional sensor data is required to more thoroughly diagnose the fault condition asset 115A is exhibiting. The asset monitoring system 130 can provide an interface to receive input of one or more condition monitoring attributes that are associated with the assets 115 and determine a route plan corresponding to those assets. In this way, the condition monitoring engineer can determine a route to specific machines which require additional sensor data to be collected in order to evaluate and diagnosis any of the assets 115 exhibiting a fault condition.

As further shown in FIG. 1, the asset monitoring system 130 includes a communications module 135. The communications module 135 can be configured to receive sensor data from the network 125 and facilitate communication of the sensor data to the processor 140, the memory 145, the display 150, and/or the GUI 155. In addition, the communications module 135 can facilitate communication of data to and/or from any of the communicatively coupled components included in the asset monitoring system 130. For example the communications module 135 can provide condition monitoring attributes and fault condition criteria that are associated with asset 115F and stored in memory 145 to the processor 140 for determination that the sensor data received from sensor 120F is indicative of a fault condition being exhibited by the asset 115F.

As shown in FIG. 1, the asset monitoring system 130 includes a processor 140. The processor 140 is configured with executable instructions, which when executed cause the asset monitoring system 130 to perform one or more functions associated with determining a route plan to identify assets for which additional sensor data is to be collected. Further discussion of the functions performed by the processor 140 will be provided in relation to the description of FIGS. 2 and 3.

As further shown in FIG. 1, the asset monitoring system 130 includes a memory 145. The memory 145 can include a variety of data storage components configured for use in the asset monitoring system 130, such as a database, a physical or virtual memory component, and/or a physical or virtual server. The memory 145 can be configured to store sensor data received from the sensors 120 via the network 125. Additionally, or alternatively, the memory 145 can be configured to store condition monitoring attributes that are associated with each asset 115 in the collection 110. The memory 145 can also be configured to store fault condition criteria associated with the operating parameter measurements of assets 115. In one aspect, the memory 145 can be configured to store fault condition data corresponding to the asset 115. The memory 145 can also store previously received route plan input and the corresponding route plans which were generated by the processor 140 in response to the route plan input. Further discussion of the data stored by the memory 145 will be provided in relation to the description of FIGS. 2 and 3.

As shown in FIG. 1, the asset monitoring system 130 includes a display 150 and a GUI 155. The display 150 can be configured with a variety of graphical user interfaces (GUIs) to output condition monitoring data and/or receive inputs associated with determining a route plan identifying assets for which additional sensor data is to be collected. The display 150 can be configured on the same machine as the asset monitoring system 130, or in some embodiments, the display 150 can be configured on a machine that is remote from the asset monitoring system 130 but is communicatively coupled to the asset monitoring system 130 via the network 125. In some embodiments, the asset monitoring system 130 can output a route plan on the display 150 as a map showing the location of the assets 115 and data associated with the location of the asset 115 such as global positioning data or coordinates, asset identifiers, asset icons or images of the assets 115. Further discussion of the display 150 and the GUI 155 will be provided in relation to the description of FIGS. 5 and 6.

As further shown in FIG. 1, the asset monitoring system 130 outputs a route plan 160. The route plan 160 identifies a list of assets from which additional sensor data is to be collected in order to adequately access the operational state of an asset 115. The route plan 160 is determined by the asset monitoring system 130 based on condition monitoring attributes input into GUI 155 of display 150 upon notification of a fault condition alarm generated for one or more of the assets 115. The determined route plan 160 is then output to display 150 for display. In some embodiments, the route plan 160 can also include one or more condition monitoring attributes associated with a particular asset, such as a criticality attribute and/or an alarm level attribute. In this way, the route plan 160 identifies the assets 115 for which additional sensor data is to be collected, but also identifies the current condition monitoring attributes of the particular asset 115. The route plan 160 can also include other information such as the asset location, an image of the asset, an asset identifier, as well as historical values of one or more of the asset's condition monitoring attributes.

Figure 2:
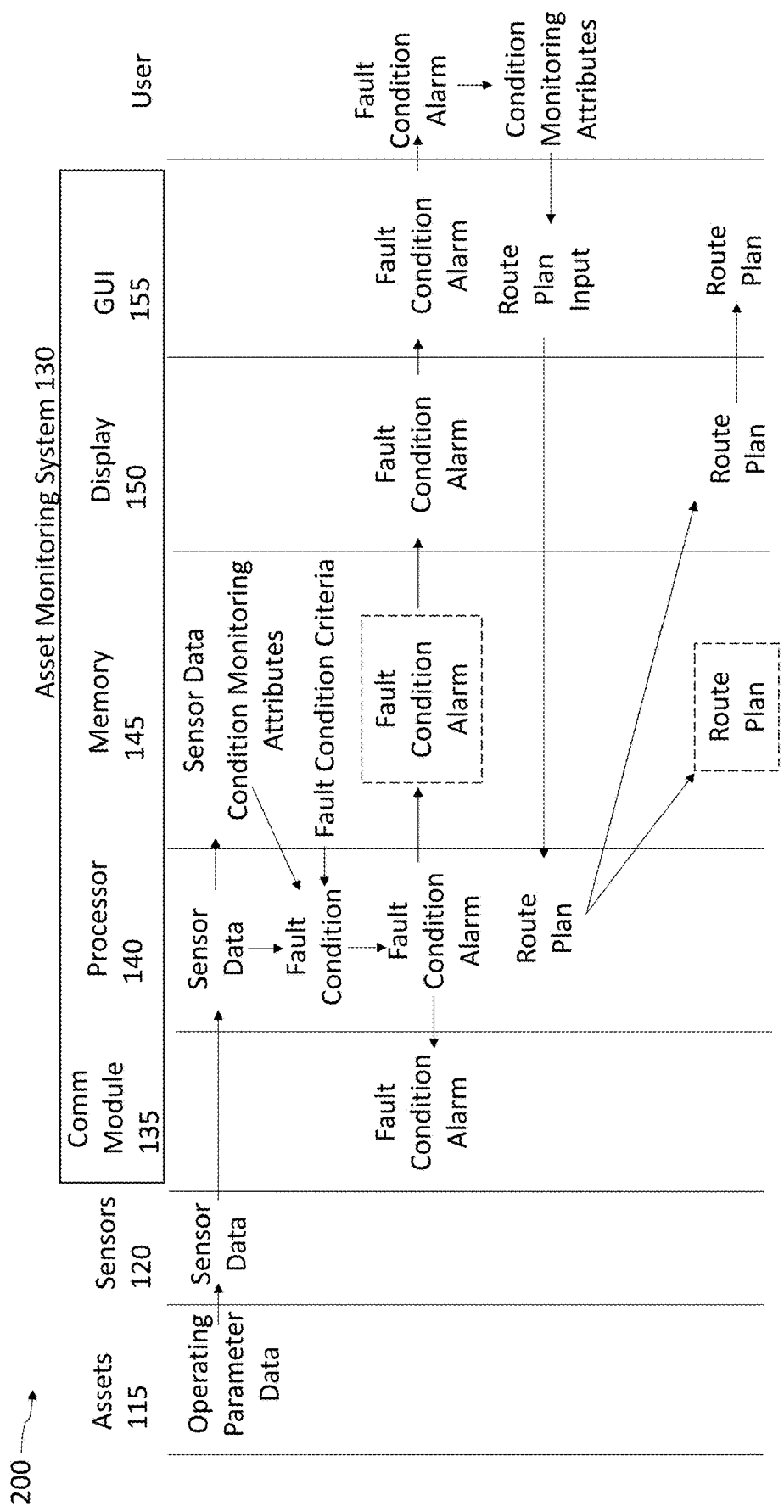
FIG. 2 is a diagram illustrating one exemplary embodiment of a data flow between components and users of the condition monitoring system of FIG. 1.

FIG. 2 is a diagram illustrating one exemplary embodiment of a data flow between components and users of the condition monitoring system of FIG. 1. As shown in FIG. 2, components of the condition monitoring system 105 are displayed as columns, in addition to a User, who can also interact with data in the condition monitoring system 105. Data that is received and/or processed by the condition monitoring system 105 is shown within the columns associated with the component or user. Data that is transmitted between components of the condition monitoring system or between a user and a component of the condition monitoring system 105 is shown with arrows between columns. The flow of data described in FIG. 2 can include data that is received and processed in order to determine a route plan identifying assets from which additional sensor data is to be collected based on the functionality of the condition monitoring system 105 described in relation to FIG. 1.

As shown in FIG. 2, and starting in the top left corner of the diagram, operating parameter data is generated by the assets 115. The operating parameter data can include a variety of data types that are specific to the type of machine or asset that is operating within the collection of assets 110. Broadly speaking, the operating parameter data can be data associated with any measurable aspect of the asset being monitored in the condition monitoring system 105. For example, asset 115 can include a heat exchanger used to cool vapor generated during a highly critical portion of a multi-stage hydrocarbon refining process. The heat exchanger, or asset 115, can include a discharge outlet at which the cooled vapor is transmitted from the heat exchanger to the next asset in the hydrocarbon refining process, for example, a condenser. The condition monitoring system 105 can be configured to monitor the temperature of the cooled vapor that is discharged from the discharge outlet prior to transmission to the condenser. Thus the temperature of the cooled vapor can be measured at the discharge outlet as operating parameter data of the heat exchanger 115. In other embodiments, the operating parameter data can include the temperature of the heated vapor that is received as input to the heat exchanger. Any number of operating parameter data types can be collected for monitoring using the condition monitoring system 105.

As the heat exchanger is configured within a highly-critical workflow of a multi-stage hydrocarbon refining process, the heat exchanger (or more specifically, the heat exchanger discharge outlet) can be considered as the asset 115 and can be further characterized to describe it's importance in the multistage process using one or more condition monitoring attributes, such as a criticality and a priority attribute of the asset 115. The importance of the asset 115 can be further described by one or more alarm level attributes which correspond to conditions under which an alarm would be generated if the temperature of the discharged vapor was above or below certain threshold values. The fault condition criteria or threshold values and the condition monitoring attributes associated with each asset 115 can be stored in the memory of the condition monitoring system 105 and used to determine a route plan identifying assets from which additional sensor data is to be collected, as will be described below.

As further shown in FIG. 2, the operating parameter data is transmitted to and/or received by the sensors 120. The sensors 120 can be configured to detect operating parameter data and generate a signal corresponding to a measurement of the asset's operating parameter being measured. Continuing the example above, the heat exchanger (or more specifically, the heat exchanger discharge outlet) can be considered as the asset 115 and the operating parameter data to be monitored can include the temperature of the discharged vapor. A sensor 120, for example a temperature sensor, can be configured to measure the temperature of the discharged vapor and collect sensor data identifying the temperature of the discharged vapor. The sensor data associated with the discharge vapor temperature can be lower-resolution data, for example sensor data that is collected by the sensor 120 once a day or once a week. In some embodiments the sensor 120 can be configured to collect sensor data at higher-resolutions such as once an hour or once a second. The sensors 120 can be configured to transmit sensor data via the network 125 to the communications module 135 of the asset monitoring system 130. The communications module 135 can convey the sensor data to the processor 140.

As shown in FIG. 2, the processor 140 can receive the sensor data and determine a fault condition associated with the received sensor data. The processor 140 can transmit the sensor data to memory 145 for storage. The processor 140 can determine a fault condition associated with the received sensor data by executing instructions to receive fault condition criteria and condition monitoring attributes from the memory 145 and comparing the received sensor data to stored fault condition criteria associated with the operating parameters of the particular asset 115. A fault condition can be indicated based on the received sensor data exceeding or not exceeding a threshold value associated with the operating parameter of the asset 115. Based on determining a fault condition is present, the processor 140 can execute instructions to generate a fault condition alarm to indicate that the asset 115 is not operating within the acceptable range of operating parameter values specified in the fault condition criteria.

Fault condition criteria can be stored in memory 145 and can include specifications of desired ranges for operating parameter values. Continuing the example above, upon receiving sensor data corresponding to the discharged vapor temperature, the processor 140 can execute instructions to receive the fault condition criteria associated with the heat exchanger 115 and can compare the sensor data (e.g., the discharged vapor temperature) with fault condition criteria to determine whether or not the heat exchanger is discharging vapor at an acceptable temperature. The fault condition criteria can identify a range of temperatures thresholds, for example, 150 degrees Celsius to 200 degrees Celsius. Based on comparing the discharged vapor temperature to the fault condition criteria, the processor can determine the heat exchanger 115 is operating in an acceptable or unacceptable operating condition. If the sensor data indicates the heat exchanger 114 is discharging vapor at a temperature outside of the fault condition criteria, for example, at a temperature of 250 degrees Celsius, the processor 140 can determine a fault condition based on the discharged vapor temperature exceeding the 200 degrees Celsius threshold and can generate a fault condition alarm to indicate the heat exchanger 115 is not operating within an acceptable range of operating parameter values as defined in the fault condition criteria.

The fault condition criteria can be associated with multiple operating parameter values or ranges of operating parameter values which can be used to describe the severity of a fault condition based on the magnitude of the difference between the sensor data and the value or the range of values specified in the fault condition criteria. In this way, a range of fault conditions can be determined and used to generate a range of corresponding fault condition alarm values. In the example above, the sensor data indicated the temperature of the discharged vapor was 250 degrees Celsius. The processor 140 can determine, based on the fault condition criteria, that a discharged vapor temperature above 225 degrees Celsius should be associated with a level 2 alarm. Similarly, the fault condition criteria could describe that a discharge vapor temperature above 251 degrees Celsius correspond to a level 3 alarm and a discharge vapor temperature above 275 degrees Celsius correspond to a level 4 alarm. In this way, a range of fault condition alarms can be generated by the processor 140 based on the magnitude of a difference between the received sensor data and the acceptable operating parameter values or value ranges specified in the fault condition criteria.

Condition monitoring attributes can also be stored in memory 145 and can be used by the processor 140 to indicate a fault condition. The condition monitoring attributes can include an alarm level attribute, a priority level attribute, and/or a criticality attribute. The processor 140 can receive the condition monitoring attributes associated with the asset 115 for use in determining a fault condition. For example, upon determining that the discharge vapor temperature of the heat exchanger 115 was 250 degrees Celsius and associated with a level 2 alarm level attribute, the processor 140 can receive a criticality attribute associated with the heat exchanger 115. The criticality attribute can indicate that the heat exchanger 115 is a highly-critical asset due to the specific placement or role of the heat exchanger 115 in the multi-stage hydrocarbon refining process.

As further shown in FIG. 2, the processor 140 can generate a fault condition alarm based on the determined fault conditions associated with the asset 115. The fault condition alarm is ultimately provided to a user to indicate that an asset 115 is operating outside of the acceptable operating parameter values or range of values and additional sensor data should be collected to evaluate the asset 115 further. The generated fault condition alarm can include condition monitoring attributes such as the alarm level, the criticality attribute, and/or the priority of the asset 115. In some embodiments, the criticality attribute can be combined with the fault condition alarm to determine whether or not the asset 115 should be added to a route plan. In this way, a user can be informed of the current operational state of the asset 115 and how the asset 115 is characterized within the condition monitoring system. A fault condition alarm can be generated and provided back to the communications module 135 for transmission to a user or other components of the asset monitoring system 130. For example, the processor 140 can transmit the fault condition alarm to the communications module 135 to be processed and provided to a user as an email, a text message, an SMS message, or a phone call. The fault condition alarm can also be optionally stored in memory 145 (as shown by dashed lines) and integrated into an asset fault prediction model and/or a collection fault prediction model including historical sensor data, fault conditions, and fault condition alarms. The fault condition alarm can also be transmitted to the display 150 as well as the GUI 155 to be provided to a user. The fault condition alarm can be conveyed to a user via the display 150 and/or the GUI 155 using an audio alert, and/or a visual indicator. For example, in some embodiments, the asset monitoring system 130 can be configured with a GUI displaying the operating status of each asset in a collection of assets monitored using the condition monitoring system 105. Based on determining a fault condition alarm associated with one of the assets 115, the processor 140 can generate a fault condition alarm as a change in color of a status indicator associated with the particular asset exhibiting a fault condition. A variety of graphical affordances can be configured to depict the fault condition alarm in the display and/or GUI including use of icons, images, colors, and/or sounds.

Upon receipt of the fault condition alarm, a user can enter condition monitoring attributes to generate a route plan identifying assets from which additional sensor data is to be collected. In some embodiments, the user can enter condition monitoring attributes to generate a route plan without receiving a fault condition alarm. The fault condition alarm provides the user with feedback that the operating parameter values of the asset, for example the heat exchanger 115, have been determined to be in a fault condition. The user can view the current operating parameter values and the condition monitoring attributes included in the fault condition alarm to determine a route plan to the asset in order to collect additional sensor data. The user can input condition monitoring attributes that are associated with the specific asset 115 for which the fault condition alarm was generated, as different condition monitoring attributes associated with other assets 115 from which the condition monitoring engineer seeks to collect additional sensor data. Continuing the example above, a fault condition alarm generated in regard to a level 2 alarm level based on the elevated discharged vapor temperature of the highly-critical heat exchanger 115, can inform the condition monitoring engineer that inspection of other assets should be performed such as assets which can be exhibiting similar alarm levels or have similar criticality attributes.

As shown in FIG. 2, the user can enter condition monitoring attributes as route plan input into the GUI. The GUI can receive the user's condition monitoring attribute input and provide the input to the processor 140 for determination of a route plan. The route plan input can include input of condition monitoring attributes such as an alarm level attribute, a criticality attribute, and/or a priority level attribute. The condition monitoring attributes that are provided by the user as route planning input can be the same as those received in the fault condition alarm, different from those received in the fault condition alarm, or a combination of each. In this way, the user can input condition monitoring attributes associated with the asset 115 for which the fault condition alarm was generated, as well as other assets 115 in the same collection which can be exhibiting similar condition monitoring attributes, such as assets with the same alarm level attribute or assets with the same criticality attribute. The GUI used to receive the condition monitoring attributes will be described further in relation to FIG. 5.

Based on receiving the route plan input, the GUI can provide the input to the processor 140 for determination of a route plan. The route plan can identify assets which correspond to the condition monitoring attributes provided as route plan input to the GUI by the user. The processor 140 can query the memory 145 to identify a list of assets whose condition monitoring attributes match those provided as input by the user. The route plan can identify those assets for which additional sensor data is to be collected in order to evaluate or further diagnose the asset's operational state or performance. As shown in FIG. 2, the route plan can be output by the processor 140. In some embodiments, the processor 140 can optionally output (as shown by dashed lines) the route plan to the memory 145. In this example, the determined route plan can be stored and used to predict future route plans associated with similar condition monitoring attributes. The processor 140 can output the route plan to the display 150 and/or the GUI 155 so that the user can receive the route plan identifying the list of assets to visit in order to collect additional sensor data.

Figure 3:
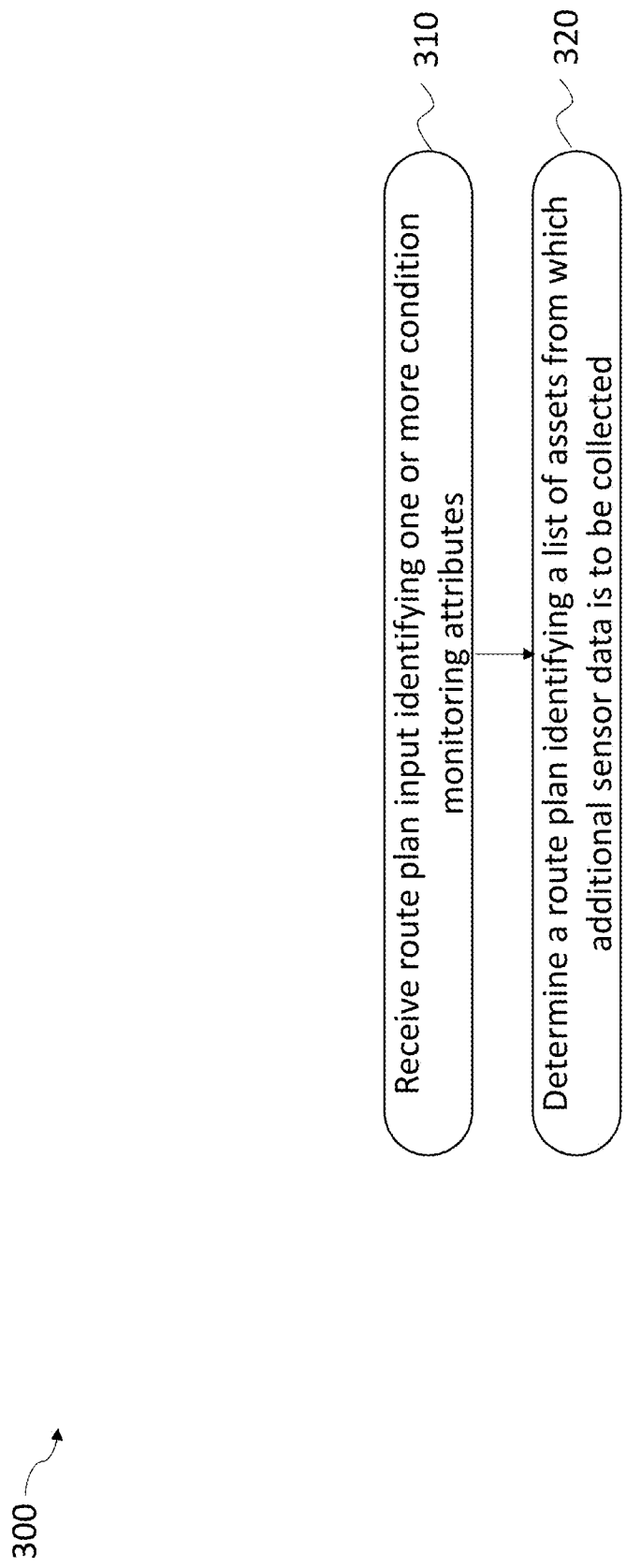
FIG. 3 a flow diagram illustrating one exemplary embodiment of a method for determining a route plan identifying assets from which additional condition monitoring data is to be collected.

FIG. 3 is a flow diagram illustrating an exemplary embodiment of a method 300 for determining a route plan identifying assets from which additional condition monitoring data is to be collected. The method 300 is discussed with reference to the condition monitoring system 105 as shown and described in relation to FIG. 1. In certain aspects, embodiments of the method 300 can include greater or fewer operations than illustrated in FIG. 3 and the operations can be performed in a different order than illustrated in FIG. 3.

In operation 310, GUI, such as GUI 155, receives route plan input identifying one or more condition monitoring attributes. A user can provide, as input to the GUI 155, condition monitoring attributes which the processor 140 can use to query the memory and identify assets 115 which have condition monitoring attributes corresponding to the condition monitoring attributes received as route plan input. The route plan input can include an alarm level attribute, a criticality attribute, and/or a priority attribute. For example, a user can provide route plan input to determine a route plan identifying all machines exhibiting a level 2 alarm level attribute.

In operation 320, the processor 140 determines a route plan identifying a list of assets from which additional sensor data is to be collected. To determine the route plan, the processor 140 can query the memory 145 to identify assets 115 associated with condition monitoring attributes which match those provided as route plan input in operation 310. Continuing the example above, the processor 140 can query the memory 145 to determine a route plan identifying any assets 115 exhibiting a level 2 alarm level attribute and include those assets in the route plan.

In this way, a condition monitoring engineer or other user of the condition monitoring system 105 can dynamically determine a route plan identifying a list of assets from which additional data is to be collected without visiting every single asset in a collection. The condition monitoring system 105 improves route plan determination by identifying only those assets whose operating parameter values are in exception to normal operating parameter value conditions. Thus, route planning can be performed more efficiently and reduce the amount of time workforces are exposed to industrially hazardous operating environments in which the assets can be located.

Figure 4:
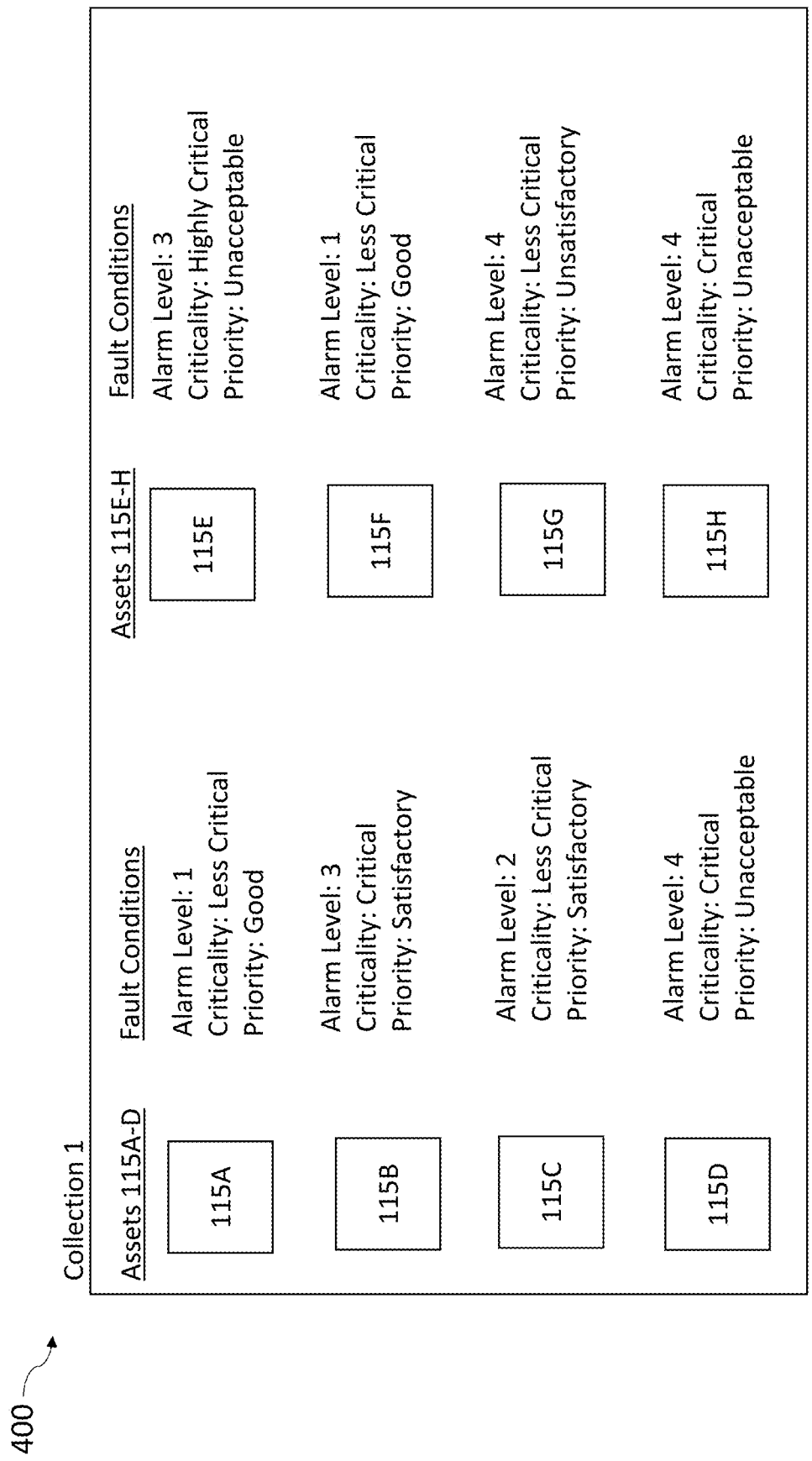
FIG. 4 is a diagram illustrating one exemplary embodiment of a display of a collection of assets and associated fault condition data.

FIG. 4 is an exemplary embodiment of a display 400 of a collection of assets and associated fault condition data. The display 400 includes a list of assets associated with collection 1, for example assets 115A-115H. The display 400 also includes fault condition attribute data associated with each asset 115. The fault condition attribute data for each asset 115 can be displayed as the most recently determined fault condition attribute data or the display 400 can present a previously stored version of the fault condition attribute data. The data provided in display 400 can be stored in memory 145 and accessed by the processor 140 in order to determine a route plan identifying assets from which additional sensor data is to be collected. For example, using the condition monitoring attribute data shown in display 400, assume that a fault condition alarm is generated in response to asset 115D. As shown in FIG. 4, condition monitoring attribute data associated with asset 115D indicates that the alarm level attribute is an alarm level 4, the criticality level is critical, and the priority level is unacceptable. A fault condition alarm can be generated based on the alarm level attribute and a user will be notified of the fault condition associated with asset 115D. Based on receiving the fault condition alarm associated with asset 115D, the user can provide route plan input, in the form of condition monitoring attributes, to the GUI 155 to determine a route plan identifying assets 115 from which additional sensor data is required. In some embodiments, the user can provide route plan input, in the form of condition monitoring attributes without receiving a fault condition alarm. In this way, a new route plan can be periodically generated, such as every week or every month, based on the user-provided condition monitoring attributes and any existing fault conditions.

Figure 5:
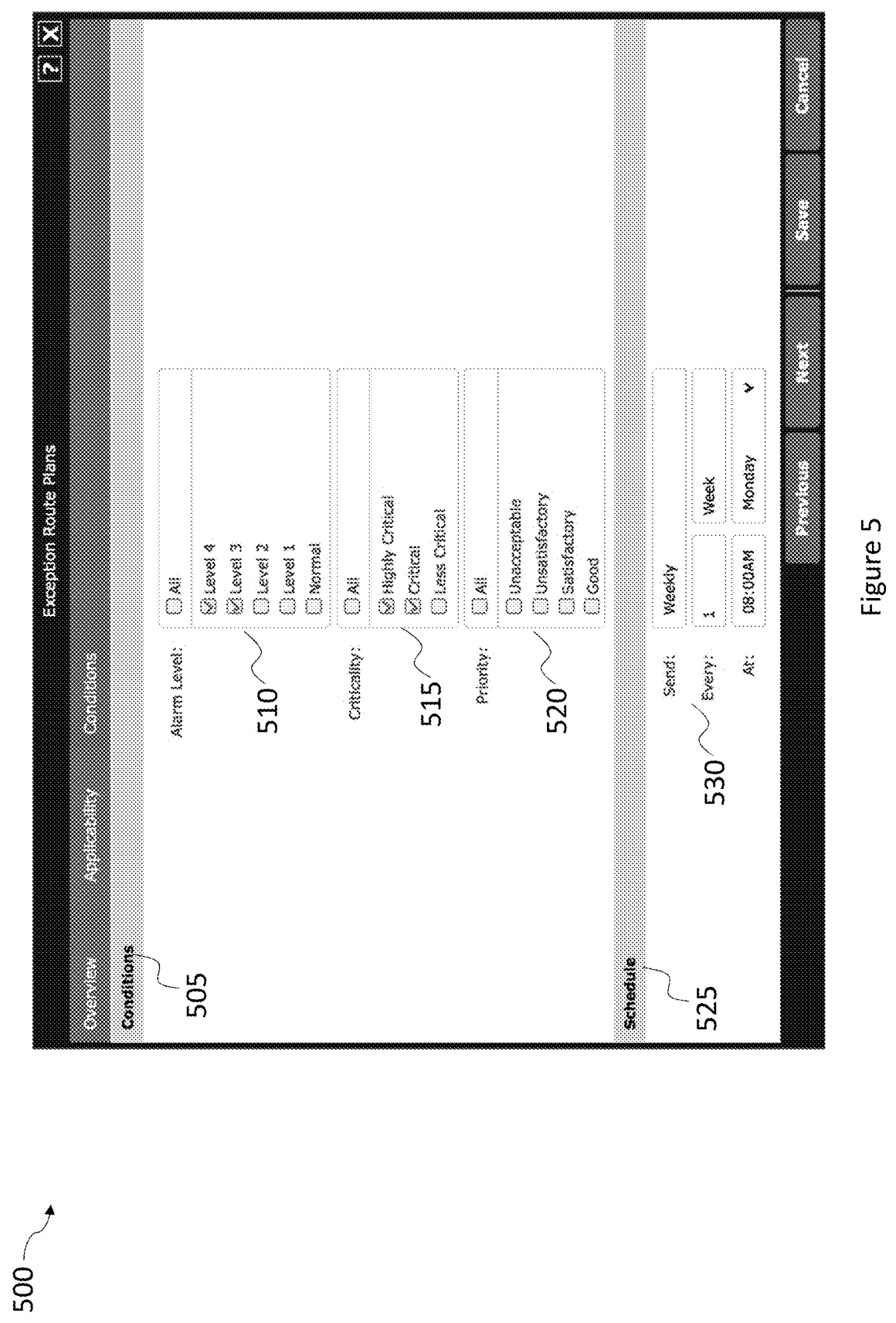

FIG. 5 is a diagram illustrating one exemplary embodiment of a GUI 500 to receive route plan input. As shown in FIG. 5, the GUI 500 includes a condition input section 505. The condition input section 505 includes graphical affordances for the user to provide one or more selections associated with each condition monitoring attribute. For example, the condition input section 505 includes selections associated with alarm level attributes 510, criticality attributes 515, and priority attributes 520. A variety of graphical affordances can be considered for use in condition input section 505 including drop-down lists, sliders, selection boxes, radio buttons, toggle switches, and/or any combination thereof. The graphical affordances allow a user to enter fault condition attribute values as criteria for determining a route plan.

As further shown in FIG. 5, the GUI also includes a schedule input section 525. The schedule input section 525 includes graphical affordances for the user to input a schedule or frequency for which the route plan should be determined and generated based on the condition monitoring attribute selections provided in the condition input section 505. For example, the user can input schedule selections 530 to indicate the frequency, day and time at which the route plan is to be determined and generated. Similarly to the condition input section 505, a variety of graphical affordances can be considered for use in schedule input section 525 including drop-down lists, selection boxes, radio buttons, sliders, toggle switches, and/or any combination thereof.

Based on the condition monitoring attributes associated with the assets 115A-115H of collection 1 as shown in FIG. 4 and the route plan input provided in FIG. 5, the processor can determine and generate a route plan. For example, as shown in the condition input section 505 of the GUI 155 shown in FIG. 5, the user has selected to determine a route plan including any asset for which the alarm level attributes are identified as Level 3 or Level 4 and any asset for which the criticality attribute is identified as Highly Critical or Critical. The user has chosen to provide no condition monitoring attributes identifying assets based on a priority attribute selection. The condition monitoring attribute selections can be provided in the GUI 155 with "AND" operators to generate a list of assets in which all condition monitoring attribute selections should be matched with those stored in memory. In some embodiments, the condition monitoring attribute selections can be provided in the GUI 155 with "OR" operators to generate a list of assets in which some but not all of the all condition monitoring attribute selections should be matched with those stored in memory. Additionally, the user has provided selections in the schedule input section 525 for the route plan to be determined and generated once every week at 08:00 AM on Mondays. In some embodiments, the GUI 155 can include functionality to generate the route plan immediately and not upon a scheduled time and date in the future. Upon entering the condition monitoring attribute selections in the GUI 155, the processor 140 receives the inputs and queries the memory 145 in order to determine a route plan identifying assets 115 which have condition monitoring attributes matching those provided as input in the GUI 155.

FIG. 6 is a diagram illustrating one exemplary embodiment 600 of a route plan 160 determined and output by the condition monitoring system of FIG. 1. Based on the condition monitoring attributes of the assets 115 in collection 1 shown in FIG. 4, and the route plan input provided in the GUI 155 shown in FIG. 5, the processor 140 can determine and generate a route plan 160 identifying a list of assets 115 to be visited for the collection of additional sensor data. For example, the route plan input indicated the user would like to collect additional sensor data from assets with an alarm level attribute of Level 3 or Level 4, and a criticality attribute of Critical or Highly Critical. Upon querying the memory 145 for the current or most recent condition monitoring attributes, the processor 140 has determined that assets 115B, 115D, 115E and 115H have condition monitoring attributes matching at least one of the condition monitoring attributes provided by the user as route plan input and should be included in the route plan 160. Thus the user can visit assets 115B, 115D, 115E and 115H to collect additional sensor data necessary to diagnose or evaluate the fault conditions causing the observed alarm levels without having to visit every asset in collection 1.

Exemplary technical effects of the methods, systems, and devices described herein include, by way of non-limiting example, dynamically-generated, exception-based route plans identifying assets for which additional sensor data is to be collected in industrially hazardous environments. The route plans are smaller and require less memory to store than route plans identifying every asset in a collection. In addition, the route plans require less sensor data to be collected, stored and processes in a condition monitoring system thus saving computer power and resources.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A condition monitoring system, comprising:
one or more current sensors configured to interface with at least one generator in a collection of generators included in a collection of assets and output current measurements corresponding to at least one operating parameter of the at least one generator, the at least one generator associated with one or more condition monitoring attributes; and an asset monitoring system communicatively coupled to the one or more current sensors via a network, the asset monitoring system including a memory, a display including a graphical user interface, and a processor configured with executable instructions, which when executed cause the processor to, receive route plan input provided by a user via the graphical user interface, the route plan input provided in response to a fault condition alarm generated for the at least one generator based on the current measurements output from a current sensor interfaced with the at least one generator, the fault condition alarm indicating a fault condition associated with the at least one operating parameter of the at least one generator, wherein the route plan input includes a selection of one or more condition monitoring attributes provided by the user via the graphical user interface, and wherein the one or more condition monitoring attributes includes selections associated with an alarm level attribute, a criticality attribute, and a priority attribute, determine, based on the route plan input, a route plan identifying a list of generators from which the user is to collect additional current measurements, the route plan determined based on matching the one or more condition monitoring attributes identified in the route plan input with one or more condition monitoring attributes associated with the collection of generators, wherein the generators identified in the route plan include generators in the same collection as the at least one generator for which the fault condition alarm was generated, and output the determined route plan on the display, wherein the displayed route plan is provided as a map showing a location of each of generators included in the list of generators from which the user is to collect the additional current measurements.

2. The system of claim 1, wherein the collection of assets further includes at least one of a motor, a gas turbine, a heat exchanger, a centrifugal pump, a centrifugal compressor, a fan, a reciprocating compressor, a steam turbine, a wind turbine, a portion of pipe, an axial compressor, a screw compressor, a gear, a turbo expander, a blower, an agitator, a mixer, a pulp refiner, a ball mill, a crusher, a pulverizer, an extruder, a pelletizer, and a cooling tower.

3. The system of claim 2, wherein at least one asset in the collection of assets is communicably coupled to at least one sensor includes a proximity sensor, a velocity sensor, an accelerometer, a position sensor, a temperature sensor, a pressure sensor, a current sensor or a voltage sensor.

4. The system of claim 1, wherein the network includes a wireless communication network, a wired communication network, or a combination of a wireless and wired communication network.

5. The system of claim 1, wherein the current measurements includes time-series data identifying an operating parameter value of the at least one generator measured per second, per day, and/or per month.

6. The system of claim 1, wherein the processor is further configured to output the generated fault condition alarm and associated current measurements as an input to an asset fault prediction model associated with the at least one generator for which the fault condition alarm was generated or as an input to a collection fault prediction model associated with the collection of assets including the at least one generator for which the fault condition alarm was generated.

7. The system of claim 1, wherein the received route plan input further identifies a selection of scheduling attributes corresponding to a frequency in which the determined route plan is to be output.

8. The system of claim 1, wherein the generated fault condition alarm is provided to a user as an email, a text message, a SMS message, a phone call, an audio alert, a visual indicator on the display, and/or a visual indicator on the graphical user interface.

9. The system of claim 1, wherein the fault condition is indicated based on the received current measurements exceeding a threshold value associated with the operating parameter of the at least one generator for which the current measurement were received.

10. A method, comprising:
receiving, from a user via a graphical user interface configured within a display of an asset monitoring system, route plan input provided in response to a fault condition alarm generated for at least one generator in a collection of generators included in a collection of assets, the fault condition alarm generated based on current measurements output from a current sensor interfaced with the at least one generator indicating a fault condition associated with at least one operating parameter of the at least one generator, the route plan input including a selection of one or more condition monitoring attributes provided via the graphical user interface, wherein the one or more condition monitoring attributes includes selections associated with an alarm level attribute, a criticality attribute, and a priority attribute, the asset monitoring system communicatively coupled to one or more current sensors via a network and including a memory, the display including the graphical user interface, and a processor;
determining, by the processor and based on the received route plan input, a route plan identifying a list of generators from which the user is to collect additional current measurements, the route plan determined based on matching the one or more condition monitoring attributes identified in the route plan input with one or more condition monitoring attributes associated with the collection of generators stored in the memory of the asset monitoring system, wherein the generators identified in the route plan include assets in a same collection of generators as the at least one generator for which the fault condition alarm was generated; and
outputting, by the processor, the determined route plan on the display, wherein the displayed route plan is provided as a map showing a location of each of generators included in the list of generators from which the user is to collect the additional current measurements.

11. The method of claim 10 wherein the collection of assets further includes at least one of a motor, a gas turbine, a heat exchanger, a centrifugal pump, a centrifugal compressor, a fan, a reciprocating compressor, a steam turbine, a wind turbine, a portion of pipe, an axial compressor, a screw compressor, a gear, a turbo expander, a blower, an agitator, a mixer, a pulp refiner, a ball mill, a crusher, a pulverizer, an extruder, a pelletizer, and a cooling tower.

12. The method of claim 11, wherein at least one asset in the collection of assets is communicably coupled to at least one sensor including a proximity sensor, a velocity sensor, an accelerometer, a position sensor, a temperature sensor, a pressure sensor, a current sensor or a voltage sensor.

13. The method of claim 10, wherein the network includes a wireless communication network, a wired communication network, or a combination of a wireless and wired communication network.

14. The method of claim 10, wherein the current measurements include time-series data identifying an operating parameter value of the at least one generator measured per second, per day, and/or per month.

15. The method of claim 10, wherein the processor is further configured to output the generated fault condition alarm and associated current measurements as input to an asset fault prediction model associated with the at least one generator for which the fault condition alarm was generated or as input to a collection fault prediction model associated with the collection of assets including the at least one generator for which the fault condition alarm was generated.

16. The method of claim 10, wherein the received route plan input further identifies a selection of scheduling attributes corresponding to a frequency in which the determined route plan is to be output.

17. The method of claim 10, wherein the generated fault condition alarm is provided to a user as an email, a text message, a SMS message, a phone call, an audio alert, and/or a visual indicator on the display.

18. The method of claim 10, wherein the fault condition is determined based on the received current measurements exceeding a threshold value associated with the operating parameter of the at least one generator for which the current measurements were received.

* * * * *